(12) United States Patent
McDavitt et al.

(10) Patent No.: US 8,151,086 B2
(45) Date of Patent: Apr. 3, 2012

(54) EARLY DETECTION OF AN ACCESS TO DE-ALLOCATED MEMORY

(75) Inventors: Ben McDavitt, Wichita, KS (US); Jeremy Zeller, Wichita, KS (US); Dale Harris, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 807 days.

(21) Appl. No.: 12/248,734

(22) Filed: Oct. 9, 2008

(65) Prior Publication Data

US 2010/0095081 A1    Apr. 15, 2010

(51) Int. Cl.
*G06F 12/06* (2006.01)
*G06F 11/07* (2006.01)

(52) U.S. Cl. .............. 711/208; 711/170; 711/E12.009

(58) Field of Classification Search .............. 711/170, 711/208, E12.009, E12.006
See application file for complete search history.

(56) References Cited

U.S. PATENT DOCUMENTS

| | | | | |
|---|---|---|---|---|
| 6,035,426 A * | 3/2000 | Applegate | | 714/54 |
| 7,523,284 B1 * | 4/2009 | Wilson | | 711/170 |
| 2002/0004894 A1 * | 1/2002 | Hostetter | | 711/170 |
| 2004/0107385 A1 * | 6/2004 | Bates et al. | | 714/25 |
| 2006/0236026 A1 * | 10/2006 | Hempel | | 711/103 |
| 2007/0011428 A1 * | 1/2007 | Kurtz | | 711/171 |
| 2008/0168112 A1 * | 7/2008 | Lyons et al. | | 707/206 |

* cited by examiner

*Primary Examiner* — Edward Dudek, Jr.
*Assistant Examiner* — Hal Schnee
(74) *Attorney, Agent, or Firm* — Alexander J. Neudeck; Cochran Freund & Young LLC

(57) ABSTRACT

Disclosed is a method of detecting an access to de-allocated memory, comprising: creating a pool of fixed size memory blocks that are a non-zero integer multiple of a page size of a processor; receiving a request for an allocation of a block of memory; recording a set of allocation context information in a fixed size memory block; returning a pointer to an allocation of memory within said fixed size memory block; receiving a request to de-allocate said block of memory; recording a set of de-allocation context information in said fixed size memory block; and, setting an indicator in a page table entry associated with said fixed size memory block to a first value that indicates access to said fixed size memory block is not allowed.

20 Claims, 4 Drawing Sheets

EARLY DETECTION OF AN ACCESS TO DE-ALLOCATED MEMORY

BACKGROUND OF THE INVENTION

Dynamic memory allocation allows a computer program to share limited memory resources with other computer programs. Thus, the limited memory resources of the host computer may be distributed among many pieces of code and data. Typically, in a dynamic memory allocation scheme, a dynamically allocated block of memory exists until it is explicitly released by the programmer. Dynamic memory is typically allocated to a program from the pool of memory area known as the heap (or free store).

SUMMARY OF THE INVENTION

An embodiment of the invention may therefore comprise a method of detecting an access to de-allocated memory, comprising: creating a pool of fixed size memory blocks that are a non-zero integer multiple of a page size of a processor; receiving a request for an allocation of a block of memory; recording a set of allocation context information in a fixed size memory block; returning a pointer to an allocation of memory within said fixed size memory block; receiving a request to de-allocate said block of memory; recording a set of de-allocation context information in said fixed size memory block; and, setting an indicator in a page table entry associated with said fixed size memory block to a first value that indicates access to said fixed size memory block is not allowed.

An embodiment of the invention may therefore further comprise a method of halting the execution of an application that accesses a de-allocated memory block, comprising: receiving a request for an allocation of a memory block from said application; writing allocation context information into a fixed size memory block that is part of an alternate memory pool, said alternate memory pool being comprising a plurality of fixed size memory blocks that have a size that is a positive integer multiple of a page size of a memory management unit of a processor that is executing said application; receiving, from said application, a request for a de-allocation of said memory block; writing de-allocation context information into said fixed size memory block; setting an indicator in a page table entry associated with said fixed size memory block to a first value that indicates access to said fixed size memory block is not allowed; and, in response to receiving an instruction to access a location within said memory block, invoking an exception handling procedure.

A computer readable medium having instructions stored thereon for detecting an access to de-allocated memory that, when executed by a computer, at least direct the computer to: create a pool of fixed size memory blocks that are a non-zero integer multiple of a page size of a processor; receive a request for an allocation of a block of memory; record a set of allocation context information in a fixed size memory block; return a pointer to an allocation of memory within said fixed size memory block; receive a request to de-allocate said block of memory; record a set of de-allocation context information in said fixed size memory block; and, set an indicator in a page table entry associated with said fixed size memory block to a first value that indicates access to said fixed size memory block is not allowed.

DETAILED DESCRIPTION OF THE EMBODIMENTS

Figure 1:
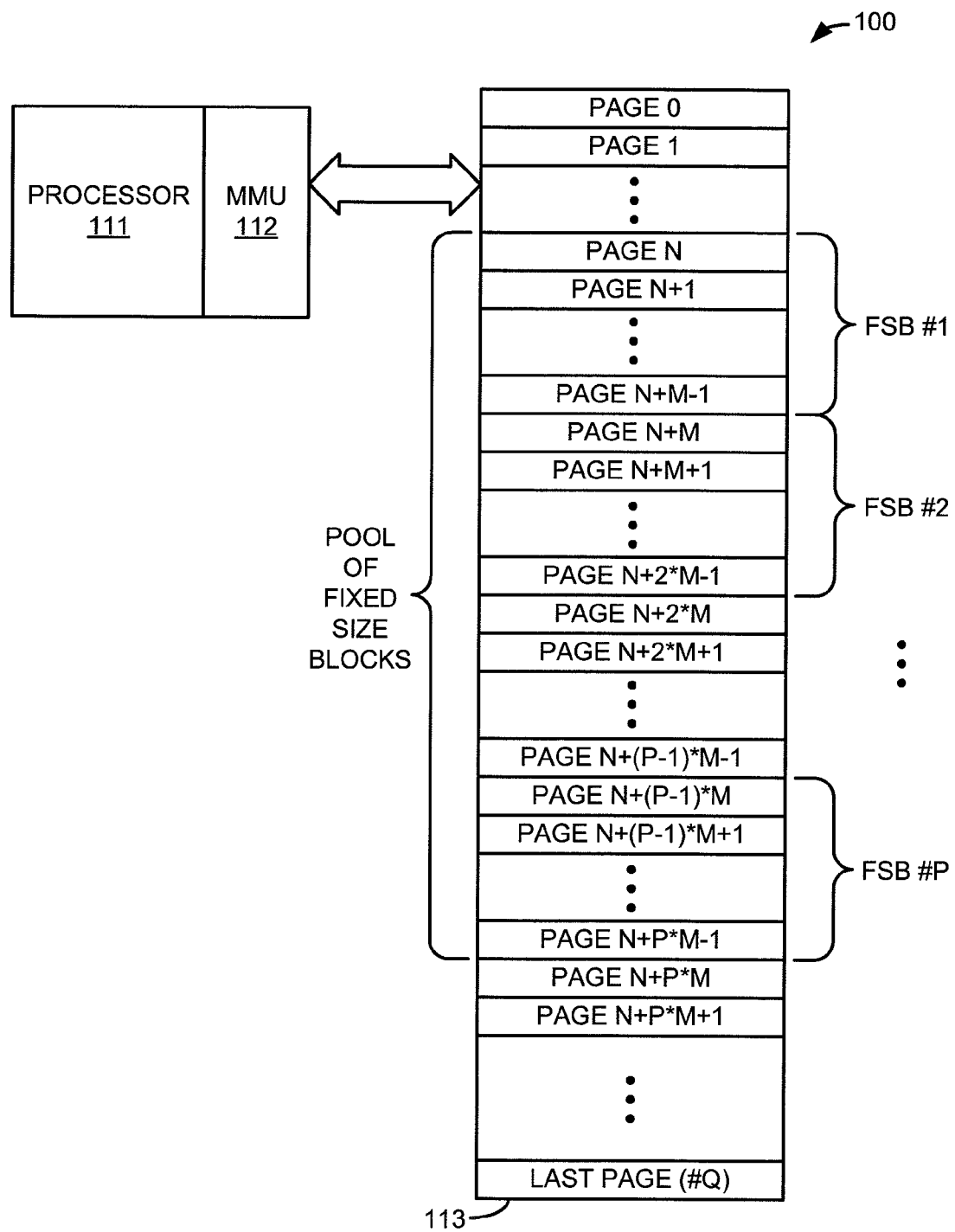
FIG. 1 is a block diagram illustrating a system that detects access to de-allocated memory.

FIG. 1 is a block diagram illustrating a system that detects access to de-allocated memory. System 100 comprises: processor 111; memory management unit (MMU) 112; and memory 113. Memory 113 is comprised of Q+1 pages of memory. These pages are defined by the page size configured by MMU 112.

A subset of the pages of memory 113 are defined to be a pool of fixed size blocks (FSBs). The pool of FSBs starts at page #N, where N is an arbitrary integer greater than or equal to zero. Each FSB has M number of pages, where M is an arbitrary integer greater than or equal to one. There are P number of FSBs, where P is an arbitrary integer greater than or equal to one.

The access to individual FSBs may be enabled or disabled by MMU 112 independent of other FSBs and the other portions of memory 113. Enabling or disabling access to individual FSBs may be accomplished by setting bits in the page table entries associated with the pages of that FSB to values that indicate access to those pages is either allowed or disabled, respectively.

The pool of FSBs may be created from the normal memory pool when the mechanism to detect access to de-allocated memory is enabled. In another embodiment, the pool of FSBs may be reserved by holding back the pages that comprise the pool of FSB from the general system memory pool during the startup of system 100. These pages may be held back by setting bits in the page table entries associated with those pages to disable access to those pages. In another embodiment, this memory may be reserved from system use by not adding it to heap space. In another embodiment, this memory may be held back by making a large allocation of heap space, and then allocating FSBs from this large allocation. MMU 112 is configured to operate using the FSBs. Data structures are created in the FSBs to manage the allocation and de-allocation of memory blocks from the pool of FSBs.

Figure 2:
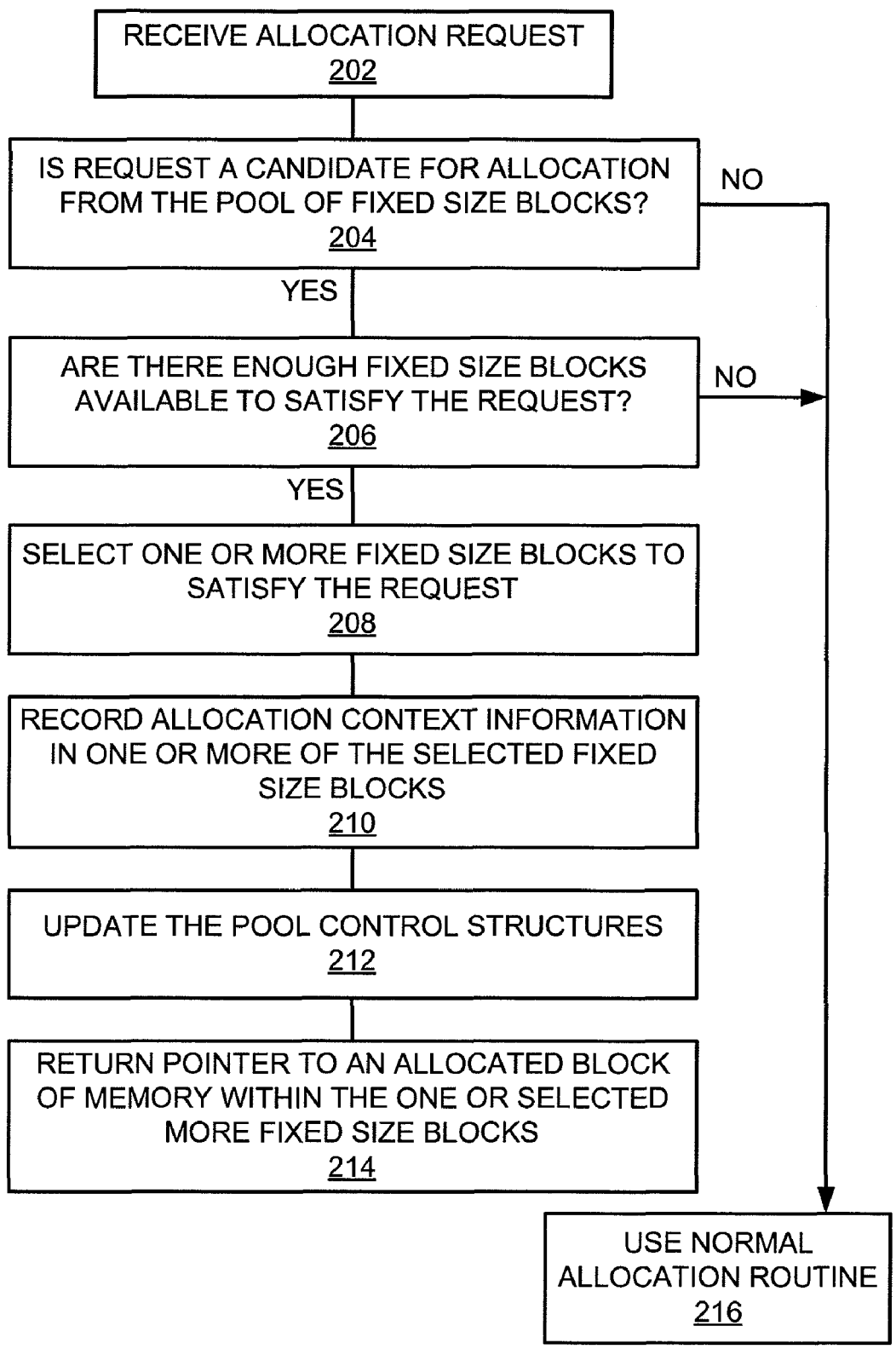
FIG. 2 is a flowchart illustrating a method of allocating memory.

FIG. 2 is a flowchart illustrating a method of allocating memory. The steps illustrated in FIG. 2 may be performed by one or more elements of system 100. In particular, the steps illustrated in FIG. 2 may be performed by processor 111 and MMU 112 during times the mechanism to detect access to de-allocated memory is enabled.

An allocation request is received (202). For example, an application that is running on system 100 may request a memory allocation. If the request is a candidate for allocation from the pool of FSBs, flow proceeds to block 206 (204). If not, flow proceeds to block 216. In block 216, a normal memory allocation routine is used to allocate the requested block. Thus, in block 216 the allocation request received in block 202 will be allocated from memory that is not in the pool of FSBs.

A block is a candidate for allocation from the pool of FSBs if it is a request from the application, process, or routine that a user wants to check for accesses to de-allocated memory. For example, the user may trust that the operating system is not accessing de-allocated memory. Therefore, memory allocation requests from the operating system may not be candidates for allocation from the pool of FSBs. In another example, the user may suspect that a particular application or subroutine is accessing de-allocated memory. In this case, memory allocation requests from this application or subroutine would be candidates for allocation from the pool of FSBs.

If there are enough FSBs available to satisfy the request, flow proceeds to block 208 (206). If there are not enough FSBs available to satisfy the request, flow proceeds to block 216.

One or more FSBs are selected to satisfy the request (208). Allocation context information is recorded in one or more of the selected FSBs. In another embodiment, allocation context information may be stored outside of the pool of FSBs. Allocation context information may comprise: an indicator of the time of the allocation, an indicator of the location of the requesting instruction (e.g., a copy of the last program counter value pushed on the stack); the requesting subroutine, the requesting application, indicators that correspond to nested levels of calling subroutines, and/or a block signature indicating the state of the allocated block. Much of the allocation context information may be obtained from the values stored near the top of a stack maintained by processor 11. The allocation context information is written outside of the area that is used to satisfy the allocation request.

The pool control structures are updated (212). For example, control structures that manage the allocation of block from the pool of FSBs would be update to reflect the fact that the selected FSBs have been allocated and thus are no longer available for allocation. A pointer to an allocated block of memory within the one or more selected FSBs is returned (214).

Figure 3:
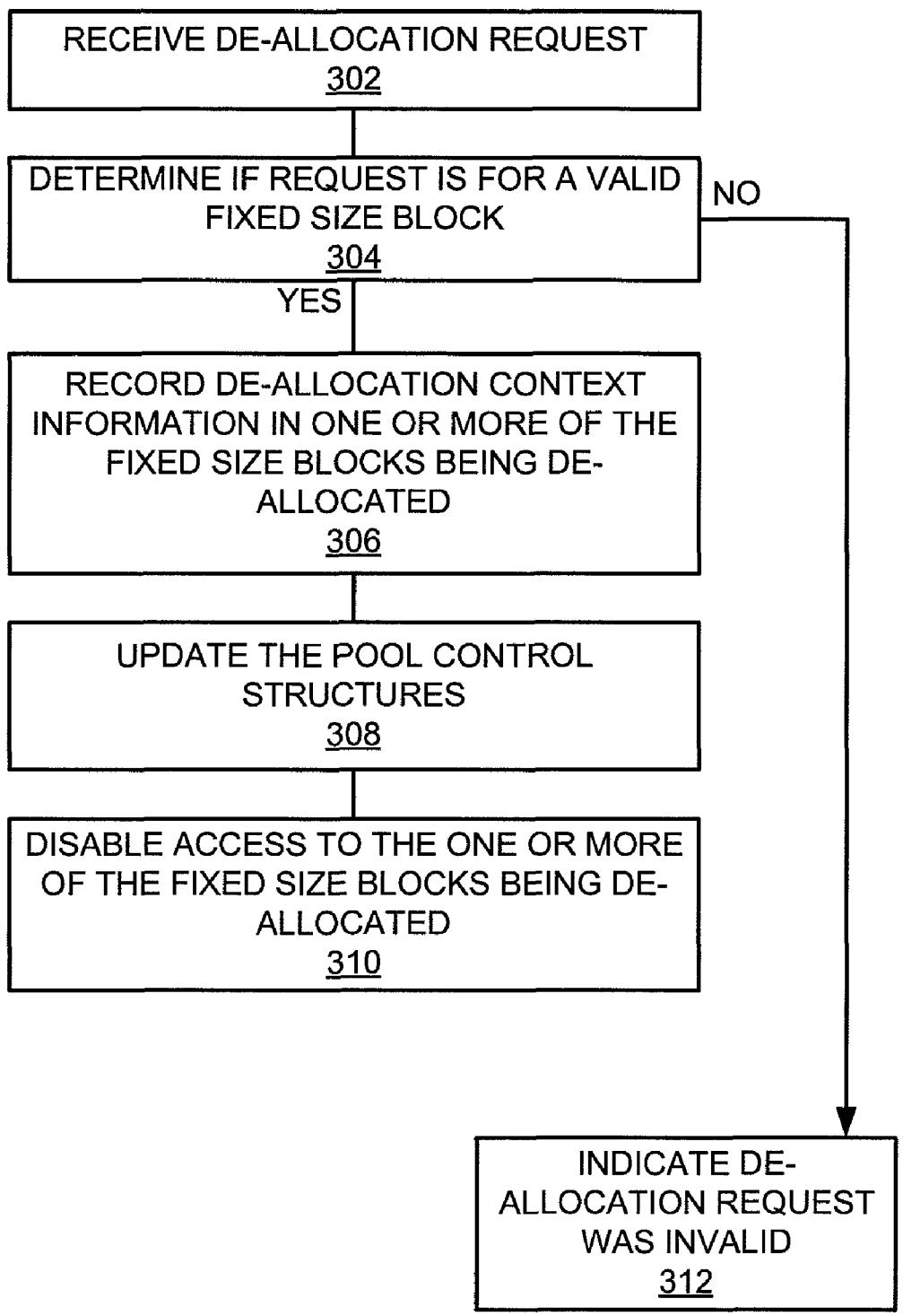
FIG. 3 is a flowchart illustrating a method of de-allocating memory.

FIG. 3 is a flowchart illustrating a method of de-allocating memory. The steps illustrated in FIG. 3 may be performed by one or more elements of system 100. In particular, the steps illustrated in FIG. 3 may be performed by processor 111 and MMU 112 during times the mechanism to detect access to de-allocated memory is enabled.

A de-allocation request is received (302). For example, an application that is running on system 100 may request a previously allocated memory block be de-allocated. If the request is for a valid FSB, then flow proceeds to block 306 (304). If the request is not for a valid FSB, then flow proceeds to block 312. In block 312, it is indicated that the de-allocation request was invalid.

De-allocation context information is recorded in one or more of the FSBs being de-allocated (306). In another embodiment, de-allocation context information may be stored outside of the pool of FSBs. De-allocation context information may comprise: an indicator of the time of the de-allocation, an indicator of the location of the requesting instruction (e.g., a copy of the last program counter value pushed on the stack); the requesting subroutine, the requesting application, indicators that correspond to nested levels of calling subroutines, and/or a block signature indicating the state of the allocated block. Much of the de-allocation context information may be obtained from the values stored near the top of a stack maintained by processor 111.

The pool control structures are updated (308). For example, control structures that manage the allocation and de-allocation of blocks from the pool of FSBs would be updated to reflect the fact that FSBs have been de-allocated. In an embodiment, these de-allocated FSBs would not be returned to the pool of FSBs available for allocation. Thus, each FSB would only be allocated once. This would prevent the allocation and de-allocation context information from being overwritten or lost. It also simplifies the task of determining which routines allocated or de-allocated a particular FSB. In another embodiment, these de-allocated FSBs may be returned to the pool of FSBs available for allocation. In this case, allocation and de-allocation context information may be written such that allocation and de-allocation information from previous allocations and de-allocations is not overwritten.

Access is disabled to the one or more FSBs being de-allocated (310). For example, access may be disabled to a particular FSB by setting one or more bits in a page table entry (PTE) corresponding to each of the pages in the FSB to values that indicate those pages may not be read or written.

Figure 4:
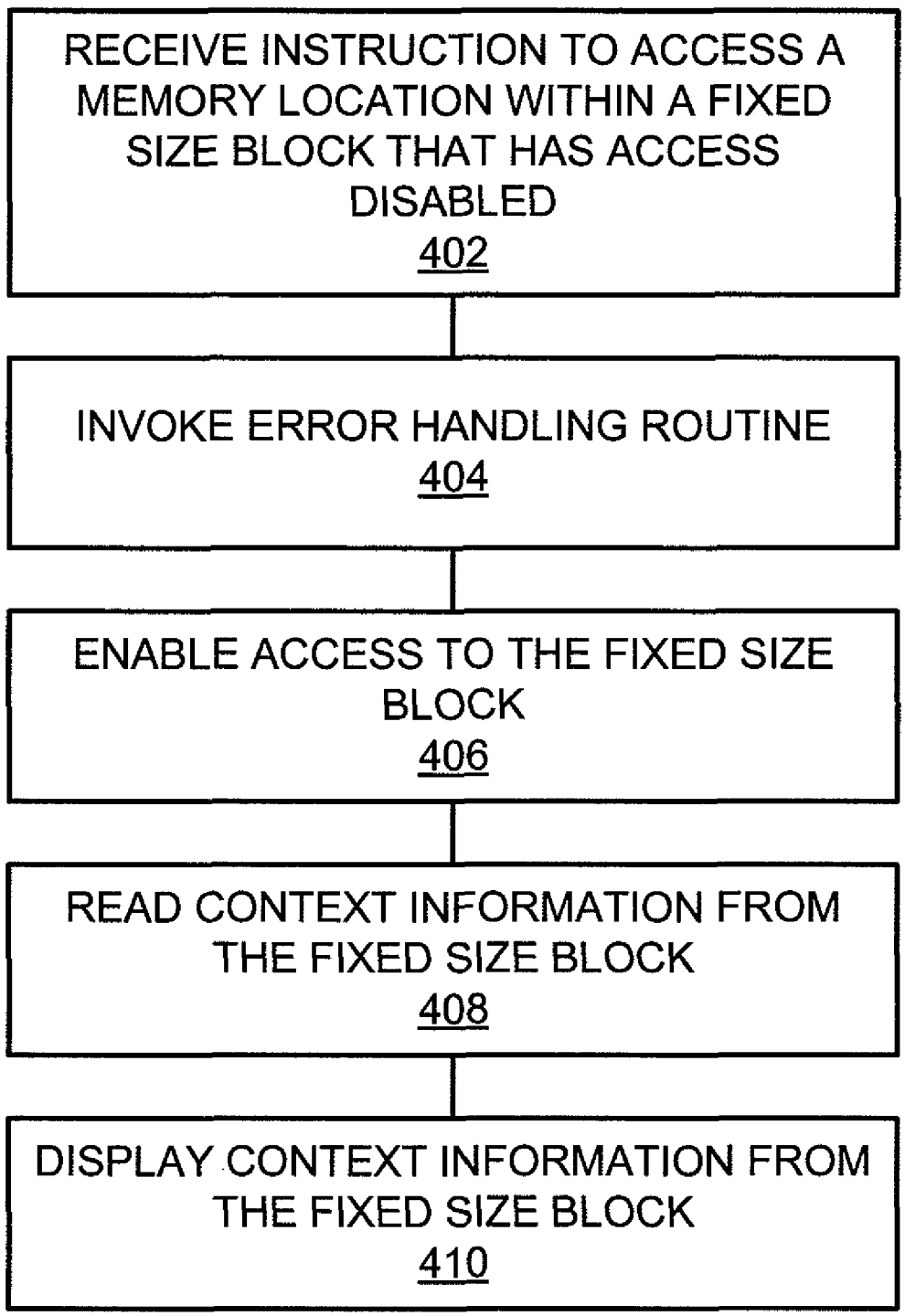
FIG. 4 is a flowchart illustrating a method of detecting an access to de-allocated memory.

FIG. 4 is a flowchart illustrating a method of detecting an access to de-allocated memory. The steps illustrated in FIG. 4 may be performed by one or more elements of system 100. In particular, the steps illustrated in FIG. 4 may be performed by processor 111 and MMU 112 when the mechanism to detect access to de-allocated memory is enabled.

An instruction is received to access a memory location within a FSB that has access disabled (402). For example, processor 111 may receive and instruction to access a memory location that is within a page of a FSB that has access disabled. Access to this page may have been disabled by the de-allocation process described in FIG. 3. When processor 111 tries to access this memory location, MMU 112 may inform processor 111 that it is not allowed to access this memory location.

An error handling routine is invoked (404). For example, when MMU 112 informs processor 111 that it is not allowed to access a memory location, processor 111 may generate an exception. In response to the exception condition, processor 111 may jump to an error handling routine. This error handling routine may halt the execution of the application that tried to access the FSB in block 402.

Access is enabled to the FSB (406). For example, the error handling routine invoked in block 404 may enable access to the FSB by writing the appropriate values into the appropriate fields of the page table entries associated with that FSB. Context information is read from the FSB (408). For example, the error handling routine invoked in block 404 may read allocation and de-allocation information written to the FSB. This allocation and de-allocation information may be allocation context information and de-allocation context information written to the FSB by the processes described in the discussions of FIG. 2 and FIG. 3, respectively.

The context information from the FSB is displayed (410). For example, the allocation and de-allocation information may be stored for future display by a debugging or display program. In another example, the error handling routine may send the allocation and de-allocation information to a display.

The overall functioning of the system may be summarized as follows. Once the pool of FSBs is created, when a block of memory is requested, the steps illustrated in FIG. 2 may be followed. This results in allocation context information being written to at least one FSB associated with the block of memory that was allocated from the selected FSBs. Once the requesting application or functions are done with the allocated memory block, the steps illustrated in FIG. 3 may be followed. This results in de-allocation context information being written to at least on FSB associated with the freed block of memory.

Once a block is freed, a subsequent access attempt (such as one through a stale pointer or access to a defunct object) will cause an exception or fault condition immediately. The application can then be suspended or halted as part of the exception fault handler. This allows for system analysis to identify problems. As described in FIG. 4, to enable effective analysis, the disabled pages are made accessible so they can be examined and the context information extracted. Procedures and/or applications that display the information about the pool of FSBs, the contents of the FSBs, and the context information help aid the system analysis.

It should be understood that the operating system typically provides allocation and de-allocation systems calls to allocate memory and free memory, respectively. These routines may be "wrapped", such that calls to these routines are intercepted and additional operations, such as those describe herein, may be performed.

The allocation size of these routines may be changed to a multiple of the CPU page size and allocations aligned on a page boundary. Then, when the memory de-allocation routine is invoked, the memory is not actually freed for re-use. Instead, the page table bits are set such that the memory is inaccessible. If there are lots of allocations and de-allocations, this will quickly run out of memory. However, it is possible that the problem is detected prior to that. In another embodiment, the de-allocation routine may keep a first-in first-out block of de-allocated memory such that when there was no free memory to allocate, the page table of the least recently de-allocated blocks are made accessible and then released so that the requested amount of memory is available for a requested allocation.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of detecting an access to de-allocated memory, comprising:
   creating a pool of unallocated fixed size memory blocks that are a non-zero integer multiple of a page size of a processor;
   receiving a request for an allocation of a block of memory;
   recording allocation context information in a fixed size memory block, the allocation context information obtained from a stack maintained by the processor;
   returning a pointer to an allocation of memory within said fixed size memory block;
   receiving a request to de-allocate said block of memory;
   recording de-allocation context information in said fixed size memory block, the de-allocation context information obtained from the stack maintained by the processor; and,
   setting an indicator in at least one page table entry corresponding to at least one page within said fixed size memory block to a first value that indicates access to all of said fixed size memory block is not allowed.

2. The method of claim 1, further comprising:
   setting said indicator to a second value that indicates access to said fixed size memory block is allowed; and,
   reading said allocation context information from said fixed size memory block.

3. The method of claim 1, further comprising:
   setting said indicator to a second value that indicates access to said fixed size memory block is allowed; and,
   reading said de-allocation context information from said fixed size memory block.

4. The method of claim 1, further comprising:
   reading said allocation context information from said fixed size memory block; and,
   reading said de-allocation context information from said fixed size memory block.

5. The method of claim 1, further comprising:
   displaying said allocation context information.

6. The method of claim 1, further comprising:
   displaying said de-allocation context information.

7. The method of claim 1, wherein said step of creating said pool of fixed size memory blocks comprises setting said indicator in each page table entry associated with said pool of fixed size memory block to said first value that indicates access to said pool of fixed size memory blocks is not allowed.

8. The method of claim 1, wherein said allocation context information and said de-allocation context information comprises an indicator of a requesting function.

9. The method of claim 1, wherein said allocation context information and said de-allocation context information comprises a first indicator associated with a time said request for said allocation of said block of memory was made and a second indicator associated with a time said request to de-allocate said block of memory was made.

10. A method of halting the execution of an application that accesses a de-allocated memory block, comprising:
    receiving a request for an allocation of a memory block from said application;
    writing allocation context information into a fixed size memory block that is part of an alternate memory pool, said alternate memory pool being comprising a plurality of fixed size memory blocks that have a size that is a positive integer multiple of a page size of a memory management unit of a processor that is executing said application, the allocation context information being obtained from a stack maintained by said processor;
    receiving, from said application, a request for a de-allocation of said memory block;
    writing de-allocation context information into said fixed size memory block, the de-allocation context information obtained from the stack maintained by the processor;
    setting an indicator in at least one a page table entry corresponding to at least one page within said fixed size memory block to a first value that indicates access to all of said fixed size memory block is not allowed; and,
    in response to receiving an instruction to access a location within said memory block, invoking an exception handling procedure.

11. The method of claim 10, wherein said allocation context information and said de-allocation context information comprises an indicator of a requesting function.

12. The method of claim 10, wherein said allocation context information comprises an indicator associated with a time said request for said allocation of said block of memory was made.

13. The method of claim 10, wherein said de-allocation context information comprises an indicator associated with a time said request for said de-allocation of said block of memory was made.

14. The method of claim 10, further comprising:
    setting said indicator to a second value that indicates access to said fixed size memory block is allowed; and,
    displaying said allocation context information and said de-allocation context information.

15. The method of claim 10, further comprising:
   determining that said instruction to access said location within said memory block was net to a memory location that is not part of said alternate memory pool.

16. A computer readable medium having instructions stored thereon for detecting an access to de-allocated memory that, when executed by a computer, at least direct the computer to:
   create a pool of unallocated fixed size memory blocks that are a non-zero integer multiple of a page size of a processor;
   receive a request for an allocation of a block of memory;
   record allocation context information in a fixed size memory block, the allocation context information obtained from a stack maintained by the processor;
   return a pointer to an allocation of memory within said fixed size memory block;
   receive a request to de-allocate said block of memory;
   record de-allocation context information in said fixed size memory block, the de-allocation context information obtained from the stack maintained by said processor; and,
   set an indicator in at least one a page table entry corresponding to at least one page within said fixed size memory block to a first value that indicates access to all of said fixed size memory block is not allowed.

17. The computer readable medium of claim 16, wherein the computer is further directed to:
   set said indicator to a second value that indicates access to said fixed size memory block is allowed;
   read said allocation context information from said fixed size memory block; and,
   read said de-allocation context information from said fixed size memory block.

18. The computer readable medium of claim 17, wherein said de-allocation context information comprises an indicator of a de-allocation requesting function and said allocation context information comprises an indicator of an allocation requesting function.

19. The computer readable medium of claim 18, wherein said allocation context information comprises an allocation timestamp indicator associated with a time said request for said allocation of said block of memory was made and said de-allocation context information comprises a de-allocation timestamp indicator associated with a time said request to de-allocate said block of memory was made.

20. The computer readable medium of claim 16, wherein the computer is further directed to:
   display said allocation context information and said de-allocation context information.

* * * * *